United States Patent [19]
Holt et al.

[11] Patent Number: 5,877,999
[45] Date of Patent: Mar. 2, 1999

[54] METHOD AND APPARATUS OF INTERROGATING A DISTRIBUTED UNDERSEA OPTICAL SURVEILLANCE SYSTEM

[75] Inventors: Michael D. Holt, Elon College, N.C.; Richard Thomas Kane, Morristown, N.J.; Timothy Scott Meyer, Greensboro, N.C.

[73] Assignee: Lucent Technologies Inc., Murray Hill, N.J.

[21] Appl. No.: 123,187

[22] Filed: Jul. 27, 1998

Related U.S. Application Data

[63] Continuation of Ser. No. 990,687, Dec. 15, 1997.
[51] Int. Cl.[6] .................................................. H04B 11/00
[52] U.S. Cl. ........................................ 367/151; 367/149
[58] Field of Search ................................. 367/131, 134, 367/149; 356/345; 250/227.27

[56] References Cited

U.S. PATENT DOCUMENTS

| | | | |
|---|---|---|---|
| 4,525,818 | 7/1985 | Cielo et al. | 367/149 |
| 4,545,253 | 10/1985 | Avicola | 367/140 |
| 4,649,529 | 3/1987 | Avicola | 367/149 |
| 4,965,732 | 10/1990 | Roy, III et al. | 367/129 |

*Primary Examiner*—Daniel T. Pihulic

[57] ABSTRACT

A method and apparatus for discriminating digital data received from a plurality of spatially distinct acoustic sensing nodes of a distributed undersea optical surveillance system. The present invention advantageously employs Code Division Multiplexing (CDM), which is a synchronous variation of Code Division Multiple Access (CDMA), to communicate a plurality of digital data bit-streams from the nodes to a common location remote therefrom. The inventive system generates at the remote location a pseudo-random reference signal that functions as a carrier for communicating sensed acoustic data from the nodes to the remote location. Using the known spatial relationship between the nodes and the remote location and the pseudo-random reference signal, the present invention operatively synchronizes correlators at the remote location to receive and differentiate data from the various individual nodes.

19 Claims, 4 Drawing Sheets

METHOD AND APPARATUS OF INTERROGATING A DISTRIBUTED UNDERSEA OPTICAL SURVEILLANCE SYSTEM

CROSS REFERENCE TO PRIOR APPLICATION

This is a continuation of U.S. patent application Ser. No. 08/990,687 filed Dec. 15, 1997.

BACKGROUND OF THE INVENTION

1. Field of the Invention

The present invention relates to optical telemetry systems and, more particularly, to a method and apparatus for interrogating a distributed undersea optical acoustic surveillance system to discriminate data received from a plurality of spaced apart acoustic sensing nodes.

2. Description of the Related Art

Current undersea acoustic surveillance systems employ complicated data node assemblies to accumulate local acoustic data and time division multiplex (TDM) data onto an optical transmission medium such, for example, as a fiber-optic cable or bundle of cables. Complex circuits including lasers that consume significant amounts of power are required in each sensing node and significantly increase installation and repair costs and adversely affect reliability. In addition, the relatively low data rate of the nodes must typically be raised to a system buss rate which is in the range of 150 Mbps.

SUMMARY OF THE INVENTION

The present invention provides a novel method and apparatus for interrogating a distributed undersea fiber-optic acoustic surveillance system to discriminate digital data received from a plurality of spatially distinct acoustic sensing nodes. The present invention advantageously employs Code Division Multiplexing (CDM), which is a synchronous variation of Code Division Multiple Access (CDMA), to communicate a plurality of digital data bit-streams from the sensing nodes to a location remote therefrom.

The system generally comprises a remote location such, for example, as a ship or a land-based station, and a data acquisition array formed of a plurality of spaced apart acoustic data acquisition nodes connected in series along transmit and receive fiber-optic cables. Each node has a plurality of data channels for gathering acoustic data and generates a digital bit-stream comprised of accumulated local acoustic sensor data from the plural data channels. The present invention uses a maximal length sequence (MLS) pseudo-random reference signal generated at the remote location as a carrier signal to communicate acoustic data from the nodes to the remote location. The nodes are spaced apart from each other and from the remote location by a predetermined distance so that the length of time in chips (i.e. one clock period) required for the MLS reference signal to travel round-trip between the remote location and each of the nodes is known. Thus, the MLS reference signal will travel between the remote location and the first node in the array (i.e. the node nearest the remote location) in a first predetermined amount of time. Likewise, the MLS reference signal will travel between the remote location and the second node (moving away from the remote location) in the array in a second predetermined amount of time, and so on. The spatial relationship between each of the nodes and the remote location is thus determinable based on the known distances therebetween and the length of time correspondingly required for the MLS reference signal to complete a round-trip excursion between each of the various nodes and the remote location.

The remote location generates and transmits the MLS reference signal onto the transmit fiber-optic cable where a portion of the reference signal is coupled to each node. The coupled portion of the reference signal is phase-modulated at each node by the digital bit-stream that represents the acoustic data accumulated by that particular node. The phase-modulated signals from the nodes are separately coupled to the receive fiber cable and collectively simultaneously communicated to the remote location as a composite signal. Thus, the composite signal received at the remote location includes digital bit-stream data from the plural nodes of the array representing the acoustic data gathered at each node.

However, due to the spatial relationship between the nodes and the remote location, the digital data from the various nodes is received at the remote location at different times. To recover the separate digital bit-stream data for each node from the composite signal, the remote location must discriminate the data received from the first node of the array, for example, from the data from the other nodes. To this end, the present invention generates a plurality of unique time-delayed reference signals that permit discrimination among the various data of the composite signal based on the known spatial relationship between the nodes and the remote location. Thus, the known time required for the reference signal to travel round-trip between the remote location and each of the nodes is used to determine the unique amount of delay for each of the time-delayed signals—with each of the time-delayed signals corresponding to a specific node in the array and the amount of the time delay for each signal being approximately equal to the time required for the reference signal to travel round-trip between the remote location and the particular node. Upon receipt at the remote location, the composite signal is accordingly split into a plurality of substantially identical composite signals, each of which is fed into one of a plurality of correlators where the split composite signal is multiplied with one of the time-delayed reference signals. Each correlator corresponds to a specific node in the array and receives as input the unique time-delayed reference signal associated with the time delay amount for that particular node. For the first node in the array, for example, the unique time-delayed reference signal corresponding to the first node is generated by delaying the original MLS reference signal by the amount of time it takes the MLS reference signal to travel round-trip between the first node and the remote location. By feeding this time-delayed signal to a correlator that corresponds to the first node, the corresponding correlator is synchronized to discriminate the acoustic data from the first location—which is carried as a digital signal (i.e. digital bit-stream) in the composite signal—from the acoustic data from other nodes which are also carried in the composite signal, since the MLS reference signal modulated with the digital bit-stream data from the first node will align with the time-delayed version of the reference signal. Thus, the present invention advantageously utilizes a plurality of unique time-delayed signals that are based on the physical configuration of the surveillance system to discriminate among the acoustic data acquired by the nodes of the system. The net result is the ability of the remote location to discriminate data from a plurality of nodes in an undersea fiber-optic surveillance array by using a single MLS reference signal to transmit the data from the nodes to the remote location and by using a time-delayed version of the same MLS reference signal to separate and retrieve the data at the remote location.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

The present invention provides a novel method and apparatus for discriminating digital data received from a plurality of spatially distinct sensing nodes of a distributed undersea optical surveillance system. The present invention advantageously employs Code Division Multiplexing (CDM), which is a synchronous variation of Code Division Multiple Access (CDMA), to communicate a plurality of digital data bit-streams from the nodes to a common location remote therefrom. The inventive system generates at the remote location a pseudo-random reference signal that functions as a carrier for communicating sensed acoustic data from the nodes to the remote location. Using the known spatial relationship between the nodes and the remote location and the pseudo-random reference signal, the present invention operatively synchronizes correlators at the remote location to receive and differentiate data from the various individual nodes.

Figure 1:
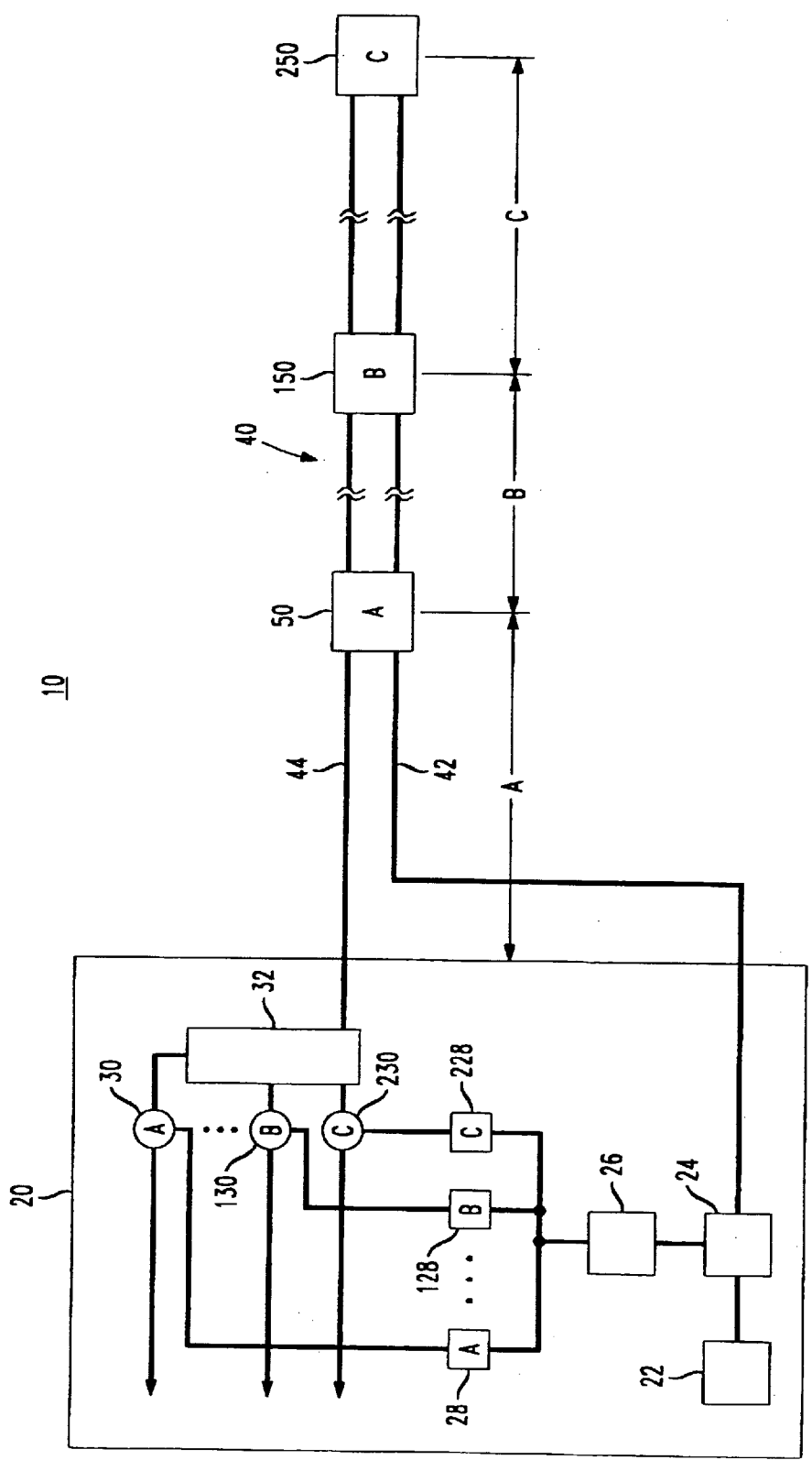
FIG. 1 is a block diagram of a distributed undersea optical surveillance system constructed in accordance with the present invention.

Referring now to the drawings, the distributed undersea optical surveillance system 10 depicted in FIG. 1 is formed by a remote location 20 that may be, for example, a ship or vessel or a land-based station, and a distributed optical network 40 having a plurality of optically passive and spaced apart data acquisition nodes 50, 150, 250 and interconnecting transmit and receive fiber-optic cables 42, 44. The nodes of the inventive system 10 are optically and electrically similar and are delineated by unique reference numerals merely for clarity and ease of discussion. When necessary to distinguish one node from another, the nodes will hereinafter be referred to by a specific reference numeral and also by a letter, e.g. node A (50) for the node nearest the remote location 20, node B (150) for the next nearest node, node C (250) for the next nearest node, etc. Otherwise, references to the "node(s) 50" is intended to individually and collectively include all of the nodes in the network 40. The network 40 may comprise an array towed behind a ship or, alternatively, a static array surveillance system that rests on the ocean floor. The nodes 50 are disposed in a predefined spatial relationship to the remote location 20 and to each other, generally designated in the drawings as distances A, B and C. The actual number of nodes 50 provided in the network 40 depends on a number of variables and is generally a matter of design choice; that number need not be defined for an understanding of or to disclose the present invention. Furthermore, it will be obvious to persons skilled in the art that the three-node configuration depicted in FIG. 1 is merely an illustrative example and is not intended to limit the present invention.

The remote location 20 includes the active optical transmitting and receiving circuits and devices for the surveillance system 10. A maximal length sequence (MLS) reference signal generator 26 generates an original MLS reference signal having a selectively variable length in bits or chips (using spread-spectrum terminology) that depends on the end-to-end length of the distributed network 40. Relating the length of the original MLS reference signal to the length of the network eliminates the possibility of having multiple images of the MLS reference signal simultaneously present or overlaid on the fiber-optic cables 42, 44. The first bit of the MLS reference signal will accordingly travel the full round-trip length of the network before another first bit is transmitted from the remote location 20. The number of bits comprising the MLS signal thus depends on the number of nodes 50 in the network 40 and the relative spacing therebetween. For example, if distances B and C in FIG. 1 are approximately 250 meters and distance A is approximately 2 kilometers, then the end-to-end length of the distributed network 40 is approximately 5 kilometers. For a MLS reference signal rate of 40 MHz, by way of illustrative example, a chip period corresponds to approximately 5 meters, and the MLS reference signal should be at least 1000 chips in length to assure pseudo-randomness for this network length. The MLS reference signal rate is preferably approximately ten-times faster than the data acquisition rate of the nodes 50, as discussed in further detail hereinbelow.

A laser 22 at the remote location 20 launches collimated light carrying no informational content into a phase modulator 24 in which the light is phase modulated by the original MLS reference signal generated by the MLS reference signal generator 26 to produce an optical version of the MLS reference signal that is propagated to the nodes 50 along the distributed network 40 via the transmit fiber cable 42.

The remote location 20 also includes a plurality of delays 28, 128, 228 connected to an output of the reference signal generator 26, each configured to impart a unique time-delay to the output MLS reference signal to thereby produce a unique time-delayed version of the reference signal. As discussed hereinabove with respect to the nodes 50, the delays 28 comprise electrically-similar devices or components and are numerically delineated in this disclosure for clarity and ease of discussion. When it is necessary to distinguish between the individual delays 28, these unique reference numerals will be used; otherwise, references herein to "delay(s) 28" is intended to individually and collectively include all such delays provided at the remote location 20. Each delay 28 is associated with or corresponds to a specific node 50 and the time-delay imparted to the reference signal by each particular delay 28 is approximately equal to the time required for the optical version of the MLS reference signal to travel round-trip between the remote location 20 and the corresponding node 50.

Each delay 28 is also connected to a corresponding one of a plurality of correlators 30, 130, 230 that are connected to the receive fiber cable 44 through a splitter 32 which splits the composite signal into a plurality of substantially identical composite signals. Thus, node A (50) has a corresponding delay A (28) and correlator A (30) at the remote location 20, node B (150) has a corresponding delay B (128) and correlator B (130), and so on. Each correlator 30 multiplies the correspondingly time-delayed version of the MLS reference signal with one of the split composite signals. The time-delayed version of the reference signal and the one of the split composite signals will thereby align, i.e. bit-1 of the time-delayed reference signal will be multiplied with bit-1 of the split composite signal, in the correlators 30 only where data from the corresponding node 50 is present. Consequently, the output of each of the correlators 30 is the MLS reference signal modulated by the digital bit-stream data (discussed below) from the corresponding node 50. As described hereinabove for the nodes 50 and delays 28, the correlators 30 are delineated herein by unique reference numerals for clarity and ease of discussion and otherwise comprise electrically similar devices or components.

Figure 2:
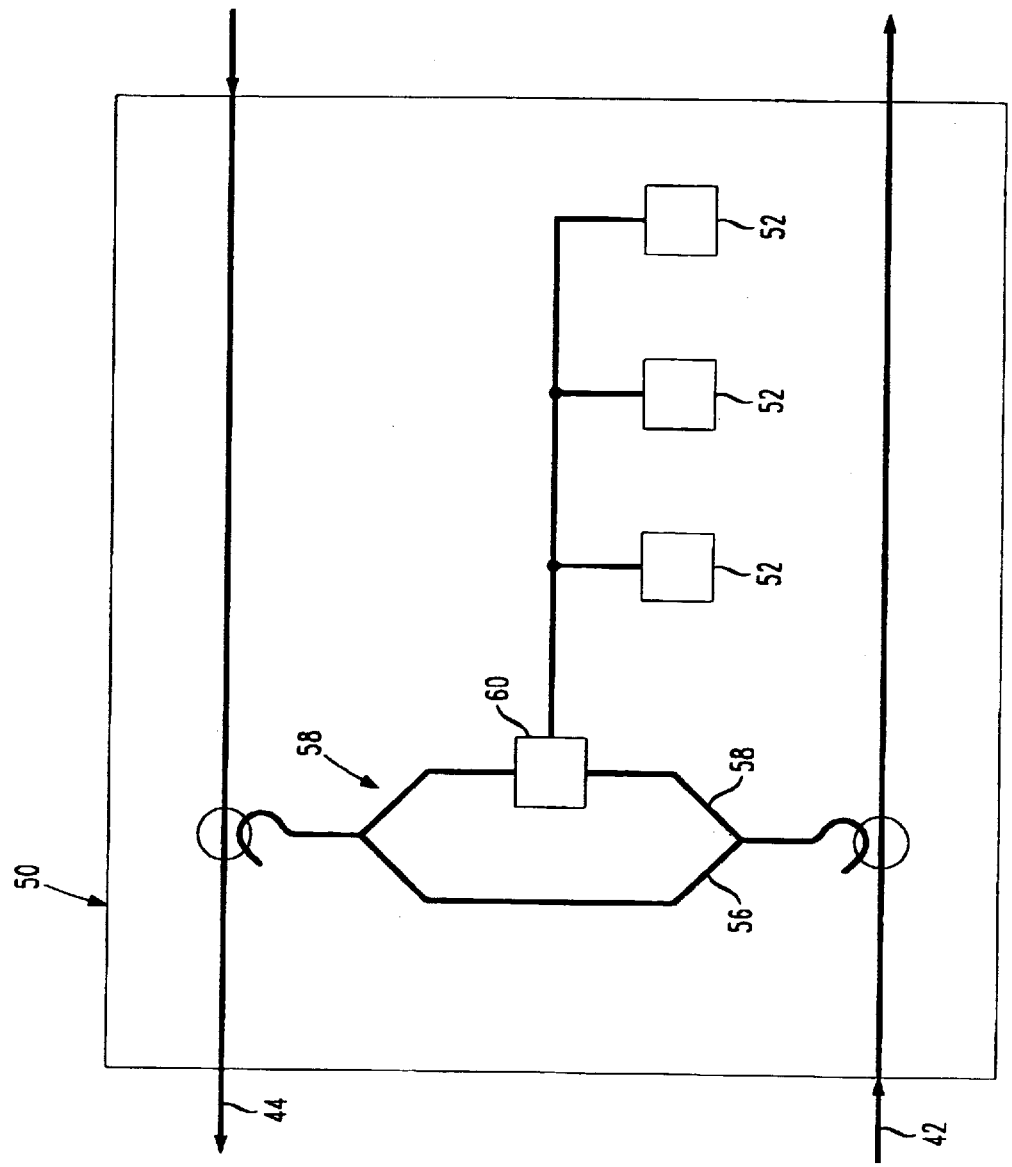
FIG. 2 is a block diagram of a representative sensor node of the surveillance system of FIG. 1.

Referring next to FIG. 2, an illustrative node 50 of the inventive surveillance system 10 is there shown in greater detail. Each node 50 is configured to acquire acoustic data from the sea floor and to convert this data to a digital format suitable for communication, here from the node 50 to the remote location 20. Each node 50 comprises a plurality of spaced apart channels each implemented as an acoustic sensing device 52 such, for example, as a ceramic hydrophone or other art-recognized piezo-electric acoustical sensing device. The sensing devices 52 extend from the node 50 in a predetermined spatial configuration for acquisition of acoustic data. The acoustic data gathered by the sensing devices 52 on each channel are converted to a plurality of digital signals using known analog-to-digital conversion methods and devices. These digital signals are time-division multiplexed (TDM) to form a single digital bit-stream that is fed into a passive phase modulator 60. The digital bit-stream is preferably scrambled to ensure proper ones density and to ensure that a digital bit zero effects a 0° phase shift or phase perturbation in the phase modulator 60 and a digital bit 1 effects a 90° phase shift in the modulator 60. The range of phase shift imparted by the digital bit-stream to the phase modulator 60 can be in the range of between approximately 0° and 180°, and is preferably between approximately 0° and 90°.

While the MLS reference signal is preferably a 40 MHz signal that defines the system buss or data rate, the nodes 50 typically operate at significantly lower data rates—preferably at least an order of magnitude lower. The present invention thus permits low-speed operation of the data acquisition devices and circuits of the nodes 50 and eliminates the need to raise the data rate of the sensing nodes to the buss rate or system data rate. For example, an illustrative node 50 may have sixty-four channels or sensing devices 52 each quantified to a twenty-four bit digital signal, and each channel sampling at a rate of approximately 2 Khz. The data rate resulting from this node is approximately 3 Mbps. Rather than raise this rate to the 40 Mhz system data rate, as previously required in the art, the high bandwidth of the network 40 is controlled by the operating speed of the reference signal generator 26 at the remote location 20.

Each node 50 further includes an interferometer 54, preferably a Mach-Zender interferometer, that couples a portion of the optical version of the MLS reference signal to the node 50. The coupled portion of the reference signal is split by the interferometer 54 into first and second parts respectively directed to a reference leg 56 and a sensing leg 58. The reference leg 56 is configured as a passive delay that delays the first part of the reference signal by a predetermined amount of time, preferably one chip or clock signal. The second part of the reference signal passes through the phase modulator 60 where it is phase modulated by the TDM digital bit-stream data. The time-delayed first part and phase-modulated second part of the portion of the reference signal are then combined at the output of the interferometer 54 and coupled to the receive fiber cable 44 for communication to the remote location 20. The signals coupled to the receive fiber cable 44 by the nodes 50 combine to form a composite signal that is received by the remote location 20. In a particularly advantageous feature of the present invention, the nodes 50 are thus optically passive devices requiring no lasers or other optically active devices. More specifically, the present invention advantageously eliminates the prior art requirement of lasers in the in-water network 40 and replaces the plurality of lasers previously required, i.e. one for each node, with a single land- or ship-based laser 22 (see, e.g., FIG. 1).

Figure 3:
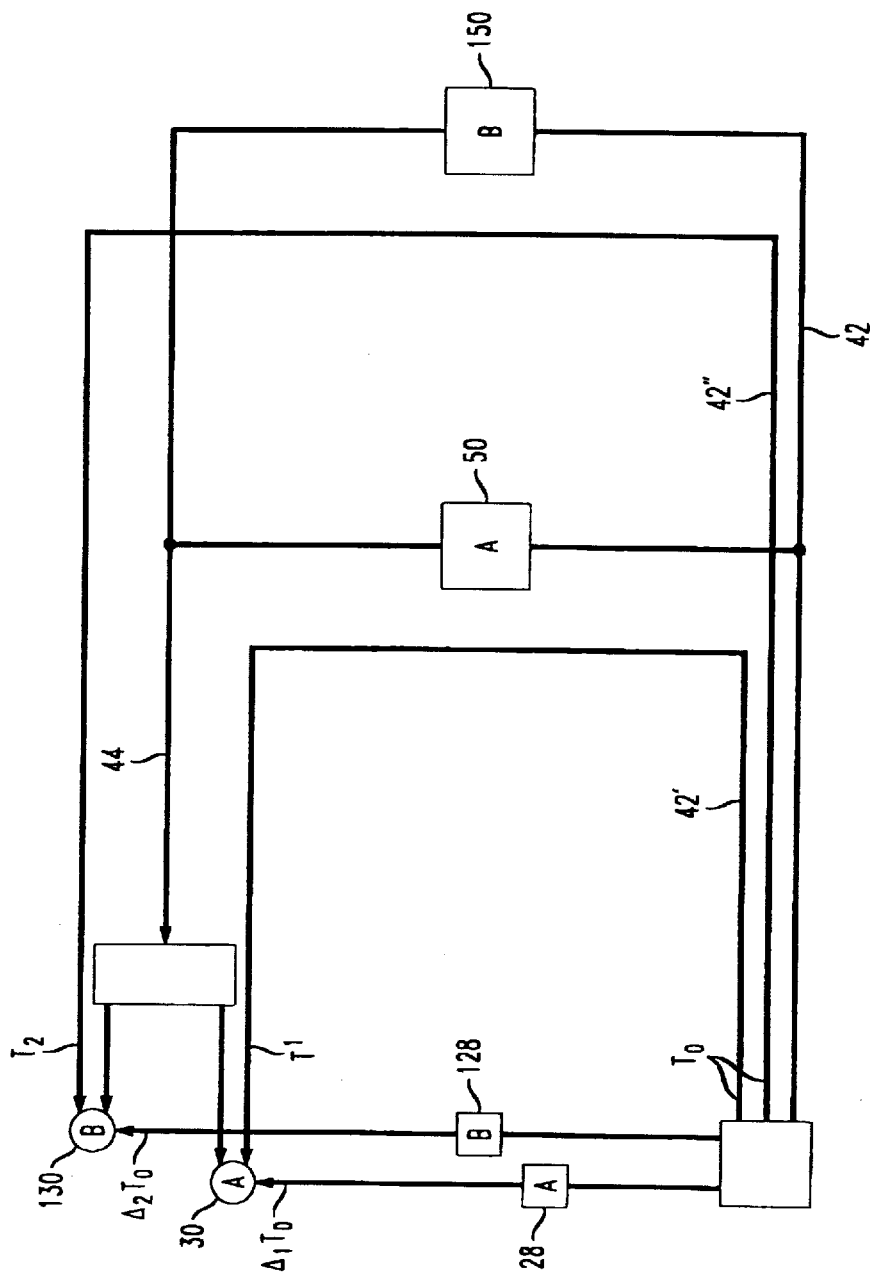
FIG. 3 is a diagrammatic representation of the optical surveillance system of FIG. 1.

The distributed surveillance system 10 is depicted diagrammatically in FIG. 3. Of the three paths 42, 42', 42" therein illustratively depicted, paths 42' and 42" are not separate physical paths but, rather, are intended to illustrate the virtual paths present in the transmit and receive cables 42, 44. For example, virtual paths 42' and 42" represent the path that an optical version of the MLS reference signal would travel between the remote location and node A (50) and node B (150), respectively. As such, these virtual paths are distinguishable by the unique amount of time required for the optical signal to complete a round-trip excursion on each path. If distance A (FIG. 1) is approximately 2 kilometers and distance B (FIG. 1) is approximately 250 meters, then each round-trip excursion between the remote location 20 and the nodes A (50) and B (150) would span 4 and 4.5 kilometers, respectively. This information is known at the remote location 20 and is used to generate the unique time-delays of delay A (28) and delay B (128), for example. It will be obvious to persons skilled in the art that the number of virtual paths present in the network 40 increases with the number of nodes 50.

With continued reference to FIG. 3, the remote location 20 begins transmitting the optical version of the MLS reference signal at time $T_0$. It can be seen in FIG. 3 that $T_0$ is the same for each of the paths 42' and 42". The time required for the optical version of the MLS reference signal to travel round-trip between the remote location 20 and the nodes A (50) and B (150) is indicated as $T_1$ and $T_2$, respectively. These times are known at the remote location on the basis of the physical and operational characteristics of the surveillance system 10 and are used to suitably delay the MLS reference signal in the delays A (28) and B (128). More specifically, the MLS reference signal is delayed by $T_1$ in delay A (28) to produce $\Delta_1 T_0$ and by $T_2$ in delay B (128) to produce $\Delta_2 T_0$. Correlator A (30), which corresponds to node A (50), is clocked by $\Delta_1 T_0$ and will automatically begin to correlate at the same time that digital data from node A (50) in the composite signal is received at the remote location 20. Consequently, the MLS reference signal in the composite signal and $\Delta_1 T_0$ will align, resulting in a high degree of correlation only for the data from node A (50). Alignment in correlator A (30) occurs only for the data received from node A (50) and the output of correlator A (30) is a carrier signal modulated by the digital bit-stream from node A (50). Similarly, correlator B (130) is clocked by $\Delta_2 T_0$ which aligns with the composite signal only for data from node B (150). The phase shift or phase perturbations imparted by the digital bit-stream at each node 50 represent the digitized acoustic data acquired by the sensing devices 52 of that node 50, thus enabling reliable targeted recovery of the acoustic data acquired at each node 50.

Figure 4:
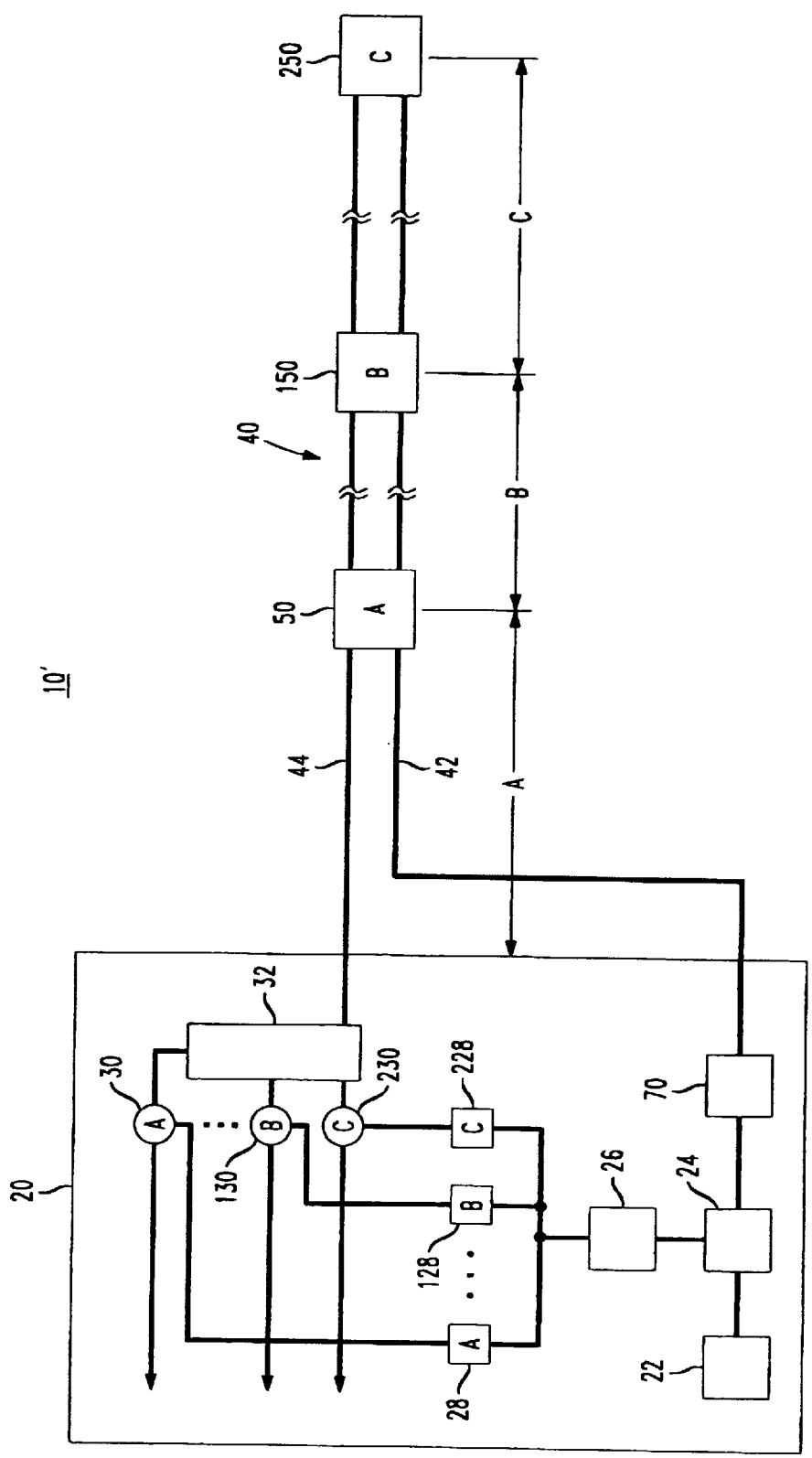
FIG. 4 is an alternative embodiment of a distributed undersea optical surveillance system constructed in accordance with the present invention.

FIG. 4 depicts an alternative embodiment of the inventive system 10'. In this modified system 10', a polarization scrambler 70 is included at the remote location to ensure that the polarization state of the MLS reference signal as it enters the nodes 50 is compatible with the phase modulator 60 in the nodes 50. The system 10' is otherwise structurally and functionally identical to the system 10 of FIG. 1.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A method of interrogating a distributed undersea optical acoustic surveillance system to discriminate acoustic data acquired by each of a plurality of predeterminately spatially separate, optically passive acoustic sensing nodes, based on a spatial relationship between each node and a location remote from the plurality of nodes, said method comprising the steps of:

(a) transmitting a clocked pseudo-random reference signal from the remote location on the transmit optical cable that originates at the remote location and to which the plural nodes are attached at spaced apart locations along the transmit optical cable;

(b) imparting at the remote location a time delay to the transmitted pseudo-random reference signal to produce a time-delayed reference signal at the remote location;

(c) at each of the plural nodes, modulating a portion of the transmitted pseudo-random reference signal with a digital bit-stream generated at said each node and representing acoustic data acquired at said each node;

(d) receiving at the remote location on a receive optical cable that terminates at the remote location and to which the plural nodes are attached in spaced apart relation a composite signal comprised of the transmitted pseudo-random reference signal modulated with the digital bit-stream data from each of the plural nodes; and (e) correlating at the remote location the received composite signal with the time-delayed reference signal to discriminate in the composite signal the digital bit-stream data generated at said each node from the digital bit-stream data generated at others of the plural nodes.

2. The method of claim 1, wherein the pseudo-random reference signal transmitted at said step (a) comprises an optical maximal length sequence (MLS) reference signal.

3. The method of claim 2, wherein said step (a) further comprises continuously transmitting the MLS reference signal from the remote location.

4. The method of claim 3, wherein the MLS reference signal has a predetermined length in bits such that a first bit of the MLS reference signal transmitted from the remote location on the transmit optical cable returns to the remote location on the receive optical cable, before a next first bit of the MLS reference signal is transmitted from the remote location.

5. The method of claim 1, wherein the time required for the pseudo-random reference signal transmitted at said step (a) to travel round-trip between the remote location and a specific one of the plural nodes is a predetermined time period, wherein the time delay imparted to the reference signal in said step (b) is approximately equal to the predetermined time period.

6. The method of claim 1, wherein said step (a) comprises the steps of:

generating a pseudo-random reference signal;

modulating a light signal generated by a laser with the generated pseudo-random reference signal; and transmitting the modulated pseudo-random reference signal on the transmit optical cable.

7. The method of claim 6, wherein the generated pseudo-random reference signal comprises a maximal length sequence (MLS) reference signal.

8. The method of claim 1, wherein said step (e) comprises multiplying the composite signal with the time-delayed reference signal.

9. The method of claim 1, wherein said step (c) comprises, at each of said nodes, phase modulating the portion of the pseudo-random reference signal with the digital bit-stream generated at each said node such that a digital 0 in the digital bit-stream imparts approximately a 0° phase shift in the portion of the pseudo-random reference signal and a digital 1 in the digital bit-stream imparts approximately a 90° phase shift in the portion of the pseudo-random reference signal.

10. The method of claim 1, wherein said step (c) comprises, at each of said nodes, phase modulating the portion of the pseudo-random reference signal with the digital bit-stream generated at each said node such that a digital 0 in the digital bit-stream imparts approximately a 0° phase shift in the portion of the pseudo-random reference signal and a digital 1 in the digital bit-stream imparts a phase shift of between approximately 90° and 180° in the portion of the pseudo-random reference signal.

11. The method of claim 1, wherein the digital bit-stream generated at each said node comprises a time-division multiplexed digital bit-stream.

12. A distributed undersea optical surveillance system for acquiring acoustic data from a plurality of spatially distinct locations and for discriminating the acquired acoustic data from each of the locations, said system comprising:

an optical cable;

an optical source at a remote location for generating an optical pseudo-random reference signal and transmitting the optical pseudo-random reference signal from the remote location on said optical cable;

a distributed sensor network comprising a plurality of optically passive acoustic sensing nodes disposed in predeterminately spaced apart relation to each other and to the remote location and each connected to said optical cable, each said node being configured for coupling a portion of the optical pseudo-random reference signal transmitted from the remote location on said optical cable and for modulating the coupled portion of the optical pseudo-random reference signal with a digital bit-stream generated at each said node and representing acoustic data acquired at said each node, and for coupling the modulated portion of the optical pseudo-random reference signal to said optical cable for communication to the remote location on said optical cable as a composite optical signal comprised of the transmitted optical pseudo-random reference signal and the digital bit-streams generated at said plural nodes;

means at the remote location connected to said optical cable for receiving the composite optical signal and for discriminating from the composite optical signal the digital bit-stream generated at each of said nodes based on the predetermined spacing of said plural nodes and the remote location.

13. The undersea optical surveillance system of claim 12, said optical source comprising a laser, a pseudo-random reference signal generator and a phase modulator, said pseudo-random reference signal generator and said laser being connected to said phase modulator to generate the optical pseudo-random reference signal.

14. The undersea optical surveillance system of claim 12, wherein the optical pseudo-random reference signal comprises a maximal length sequence (MLS) reference signal.

15. The undersea optical surveillance system of claim 13, wherein the optical pseudo-random reference signal comprises a maximal length sequence (MLS) reference signal.

16. The undersea optical surveillance system of claim 13, wherein said discriminating means further comprises:

a time-delay connected to said pseudo-random reference signal generator for imparting a predetermined time-delay to the pseudo-random reference signal to produce a time-delayed version of the pseudo-random reference signal, the time-delay imparted by said time-delay being approximately equal to a travel time required for the optical pseudo-random reference signal to travel round-trip on said optical cable between the remote location and a selected one of said plural nodes; and a correlator connected for receiving the composite optical signal communicated to the remote location from said optical cable and for receiving the time-delayed version of the pseudo-random reference signal from said time-delay, said correlator being operable for multiplying the received composite optical signal with the time-delayed version of the pseudo-random reference signal to thereby discriminate from the composite optical signal the digital bit-stream generated at said selected one of said plural nodes from the digital bit-stream generated at others of said plural nodes.

17. The undersea optical surveillance system of claim 12, wherein each of said optically passive nodes comprises:

an optical interferometer having a reference leg and a sensing leg including a phase modulator; and a plurality of channels connected to said phase modulator of said sensing leg, each of said channels including an acoustic sensing device for acquiring acoustic data and means for converting the acquired acoustic data to the digital bit-stream generated at each node.

18. The undersea optical surveillance system of claim 13, wherein said discriminating means further comprises:

a splitter connected to said optical cable for receiving the composite optical signal and for splitting the received composite optical signal into a plurality of split composite optical signals;

a plurality of time-delays connected to said pseudo-random reference signal generator for imparting a plurality of unique predetermined time-delays to the pseudo-random reference signal to produce a plurality of unique time-delayed versions of the pseudo-random reference signal, the unique time-delay imparted by each of said plurality of time-delays being approximately equal to a travel time required for the optical pseudo-random reference signal to travel round-trip on said optical cable between the remote location and a respective selected one of said plural nodes; and a plurality of correlators each connected to said splitter for receiving one of the split composite optical signals and each connected to one of said plural time-delays for receiving one of the unique time-delayed versions of the pseudo-random reference signal from said one of said plural time-delays, each of said plural correlators being operable for multiplying said one of the split composite optical signals with said one of the unique time-delayed version of the pseudo-random reference signal to thereby discriminate from the split composite optical signal the digital bit-stream generated at said respective selected one of said plural nodes from the digital bit-stream generated at others of said plural nodes.

19. The undersea optical surveillance system of claim 12, wherein optical cable comprises:

a transmit fiber optic cable originating at the remote location, each of said nodes being optically coupled to said transmit fiber optic cable for coupling a portion of the optical pseudo-random reference signal transmitted from the remote location to each said node; and a receive fiber optic cable terminating at the remote location, each of said nodes being optically coupled to said receive fiber optic cable for coupling the modulated portion of the optical pseudo-random reference signal modulated at each said node to said receive fiber optic cable for communication to the remote location.

* * * * *